United States Patent
Nanda et al.

(10) Patent No.: US 9,135,447 B1
(45) Date of Patent: Sep. 15, 2015

(54) SYSTEMS AND METHODS FOR DEPLOYING A PRE-BOOT ENVIRONMENT TO ENABLE AN ADDRESS OFFSET MODE AFTER EXECUTION OF SYSTEM BIOS FOR BOOTING A OPERATING SYSTEM IN A PROTECTED AREA

(75) Inventors: Susanta Nanda, Los Angeles, CA (US); Kent E. Griffin, Sandy, UT (US)

(73) Assignee: Symantec Corporation, Mountain View, CA (US)

( * ) Notice: Subject to any disclaimer, the term of this patent is extended or adjusted under 35 U.S.C. 154(b) by 597 days.

(21) Appl. No.: 13/361,777

(22) Filed: Jan. 30, 2012

(51) Int. Cl.
*G06F 9/00* (2006.01)
*G06F 9/24* (2006.01)
*G06F 21/57* (2013.01)
*G06F 9/44* (2006.01)
*G06F 21/78* (2013.01)

(52) U.S. Cl.
CPC ............ *G06F 21/575* (2013.01); *G06F 9/4401* (2013.01); *G06F 21/572* (2013.01); *G06F 21/78* (2013.01)

(58) Field of Classification Search
CPC ... G06F 21/575; G06F 21/572; G06F 9/4401; G06F 21/00; G06F 21/78; G06F 21/79; G06F 21/86; G06F 2221/2129
See application file for complete search history.

(56) References Cited

U.S. PATENT DOCUMENTS

| | | | |
|---|---|---|---|
| 6,415,383 B1 * | 7/2002 | Colegrove et al. | 713/2 |
| 2005/0172144 A1 * | 8/2005 | Shao | 713/200 |
| 2006/0004982 A1 * | 1/2006 | Matheny | 711/202 |
| 2008/0005527 A1 * | 1/2008 | Bang | 711/202 |
| 2008/0109628 A1 * | 5/2008 | Jing | 711/170 |
| 2008/0244252 A1 | 10/2008 | Rothman et al. | |
| 2010/0332813 A1 * | 12/2010 | Rothman et al. | 713/2 |
| 2013/0276113 A1 * | 10/2013 | Dalcher et al. | 726/23 |

OTHER PUBLICATIONS

Website: http://uk.ts.fujitsu.com/rl/servicesupport/techsupport/Software/RecoverPro/FirstWare.htm, FirstWAre RecoverPro Support Pages, Feb. 11, 2009 (2 pgs.).
Website: http://www.intel.com/technology/itj/2008/v12i4/7-paper/4-approaches2.htm, Intel Technology Journal, vol. 12, Issue 04, Dec. 23, 2008 (9 pgs.).
Website: http://www.thinkwiki.org/wikiiTalk:Predesktop_Area, Talk: Predesktop Area, May 11, 2011 (9 pgs.).
Website: http://www.trustedcomputinggroup.org/files/resource_files/87B92DAF-1D09-3519-AD80984BBE62D62D/TCG_PCSpecificSpecification_v1_1.pdf, TCG PC Specific Implementation Specification, Version 1.1, Aug. 18, 2003 (72 pgs.).

\* cited by examiner

*Primary Examiner* — Thomas Lee
*Assistant Examiner* — Zhipeng Wang
(74) *Attorney, Agent, or Firm* — Holland & Hart, LLP

(57) ABSTRACT

A computer-implemented method to deploy a pre-boot environment in a computing system is described. A protected area may be created at a first location on a data storage device of the computing system. An operating system may be installed in the protected area at the first location on the data storage device. The pre-boot environment is modified to enable an address offset mode. The pre-boot environment is installed in an unprotected area at a second location on the data storage device.

20 Claims, 10 Drawing Sheets

SYSTEMS AND METHODS FOR DEPLOYING A PRE-BOOT ENVIRONMENT TO ENABLE AN ADDRESS OFFSET MODE AFTER EXECUTION OF SYSTEM BIOS FOR BOOTING A OPERATING SYSTEM IN A PROTECTED AREA

BACKGROUND

The use of computer systems and computer-related technologies continues to increase at a rapid pace. This increased use of computer systems has influenced the advances made to computer-related technologies. Indeed, computer systems have increasingly become an integral part of the business world and the activities of individual consumers. Computer systems may be used to carry out several business, industry, and academic endeavors. The wide-spread use of computers has been accelerated by the increased use of computer networks, including the Internet.

Many businesses use one or more computer networks to communicate and share data between the various computers connected to the networks. The productivity and efficiency of employees often require human and computer interaction. Users of computer technologies continue to demand an increase in the efficiency of these technologies. Improving the efficiency of computer technologies is desirable to anyone who uses and relies on computers.

When a computer is powered on, it undergoes a process known as booting up. This process prepares the computer to perform its normal operations. For example, this may involve loading and starting an operating system. The boot sequence is the initial set of operations that the computer performs when power is switched on. A boot loader program may be accessed to load the main operating system or runtime environment for the computer. Before booting up the operating system, however, a pre-boot environment (PBE) may take control of and manage the computer. The PBE may enable access to the computing platform early in the boot sequence of the computer.

SUMMARY

According to at least one embodiment, a computer-implemented method to deploy a pre-boot environment in a computing system is described. A protected area may be created at a first location on a data storage device of the computing system. The protected area may be an area that is invisible or inaccessible to other components of the computing system. An operating system may be installed in the protected area at the first location on the data storage device. The pre-boot environment is modified to enable an address offset mode. The address offset mode may toggle the visibility and accessibility of the different regions of the computing system. The pre-boot environment is installed in an unprotected area at a second location on the data storage device.

In one embodiment, creating the protected area may include determining the size of the pre-boot environment, and setting the size of the unprotected area of the data storage device substantially equal to the size of the pre-boot environment. The size of the pre-boot environment may be less than the size of the data storage device.

In one example, installing the operating system in the protected area may include disabling the protected area by increasing the size of the unprotected area to cover substantially the data storage device, and re-enabling the protected area by decreasing the size of the unprotected area to substantially cover the size of the pre-boot environment. In one configuration, the address offset mode may include an offset substantially equal to the size of the unprotected area.

In one embodiment, settings associated with the protected area and the address offset mode may be locked. Locked settings may prevent modifications to the settings of the protected area and the address offset mode.

The data storage device may include an advanced technology attachment (ATA) interface. In one configuration, a command may be issued to create the protected area on the data storage device. In one embodiment, a command may be issued to increase and decrease the size of the unprotected area on the data storage device.

In one example, the protected area may be disabled. One or more sectors within the disabled protected area may be modified. The protected area may be re-enabled following the completion of the modifications. In one embodiment, the pre-boot environment may hand-off control to the operating system without a reboot of the computing device and without compromising the reliability, portability, and deployment of the pre-boot environment.

A computing device configured to deploy a pre-boot environment is also described. The device may include a processor and memory in electronic communication with the processor. The device may further include a pre-boot deployment module stored in the memory and configured to create a protected area at a first location on a data storage device of the computing system, install an operating system in the protected area at the first location on the data storage device, modify the pre-boot environment to enable an address offset mode, and install the pre-boot environment in an unprotected area at a second location on the data storage device.

A computer-program product for deploying a pre-boot environment is also described. The computer-program product comprising a non-transitory computer-readable medium having instructions thereon. The instructions including code programmed to create a protected area at a first location on a data storage device of the computing system, code programmed to install an operating system in the protected area at the first location on the data storage device, code programmed to modify the pre-boot environment to enable an address offset mode, and code programmed to install the pre-boot environment in an unprotected area at a second location on the data storage device.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
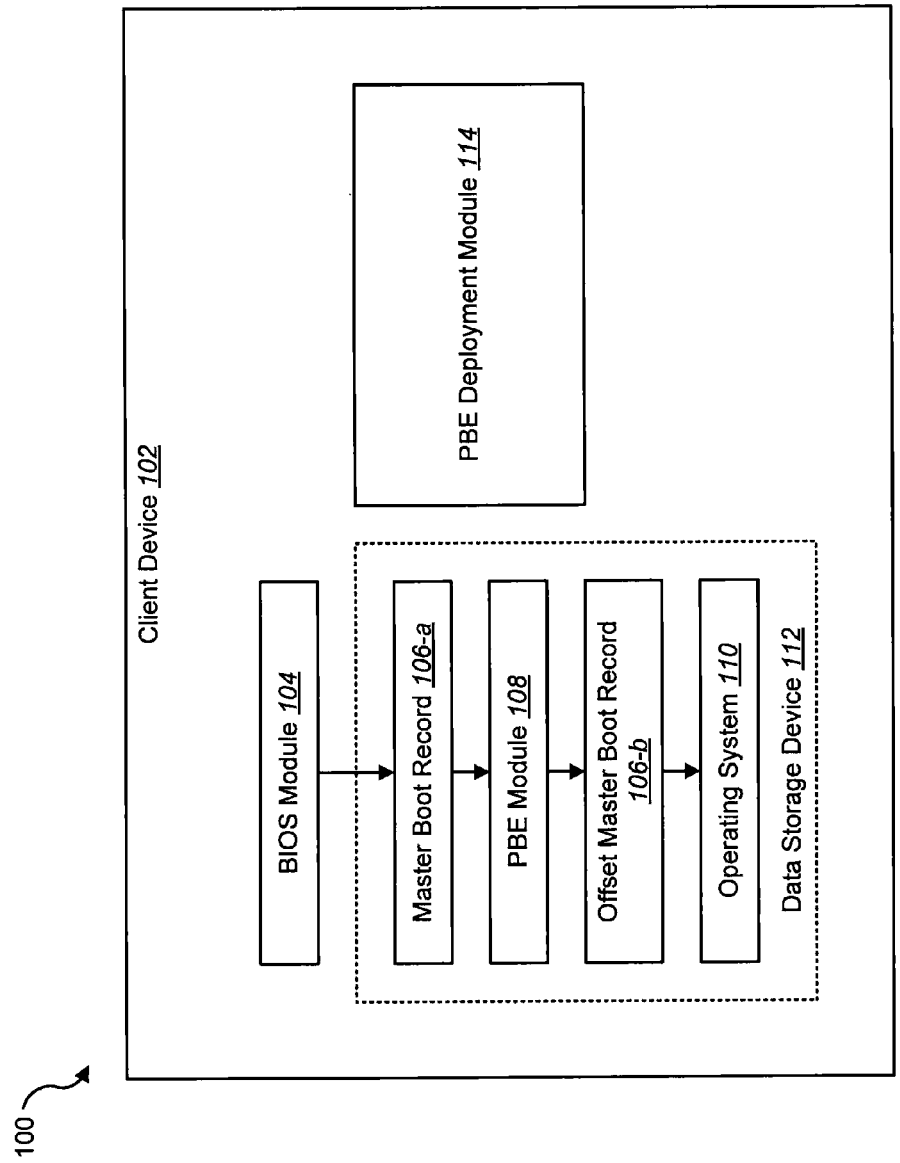
FIG. 1 is a block diagram illustrating one embodiment of an environment in which the present systems and methods may be implemented.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

A pre-boot environment (PBE) is a thin software layer that takes control of and manages a computing system after the execution of the system's platform firmware (e.g., basic input/output system (BIOS)) and before a host operating system (OS) boots up. The PBE may enable access to the computing platform early in the boot sequence and may also provide a side-channel to access the system's hardware, applications, and data. The PBE may be a building block for a number of security technologies, which may include full-disk encryption, theft deterrence, and remediation. PBE solutions may rely on carving out some space from a data store device (e.g., a disk) to store their programs/data. Typically, the PBE solutions may be accessible via the host OS.

In one embodiment, on a computing system (such as a personal computer (PC)), the platform firmware may relinquish control of the machine by loading a first sector of a data storage device, for example a boot disk. The first sector of the data storage device may be a master boot record (MBR). In one example, the first sector may be loaded to the memory of the computing system and the platform firmware may then transfer control to the MBR for execution. The MBR may be responsible for loading and executing a boot loader. Examples of the boot loader may include an NT loader, a Grand Unified Boot (GRUB) loader, or a Linux Loader (LILO) boot loader. A boot loader may be executed to load the host OS.

In order for the PBE to function as described above, the PBE must gain control of the computing system from the platform firmware prior to the OS boot loader being executed. Currently, this may be accomplished by (1) installing the PBE software on some part of the data storage device (e.g., disk), and (2) modifying the MBR so that it loads and transfers control to the installed PBE for execution before loading and executing the boot loader. For example, the MBR may be modified to point to the area of the data storage device that stores the PBE so that the PBE may gain control when the system boots up. After the PBE has completed its functions, the modified MBR may load and execute the OS boot loader in substantially the same manner as an unmodified MBR.

A shortcoming with the above approach is that the PBE is left visible to the host OS and vulnerable to deletion/bypass by malware and disk management utilities. As a result, the PBE may be easily disabled. This may be accomplished by restoring the modified MBR to its original content (i.e., an unmodified MBR). The unmodified MBR would bypass the steps of loading and transferring control to the PBE. In addition, the PBE may be disabled by deleting the sectors on the data storage device that store the PBE.

Currently, the installed PBE may be both visible and accessible to the host OS and all its applications. This may allow malware programs to easily bypass security checks that are enforced by the PBE by disabling or deleting it as described above. Further, disk management utilities that often access/modify sectors of the data storage device may be unaware of an installed PBE. As a result, the management utilities may disable the PBE unintentionally.

The present systems and methods may overcome the above mentioned shortcomings by creating a designated PBE installation area on the data storage device that is "hidden" from the OS and applications. The present systems and methods may further provide a mechanism for the PBE installed in the hidden area to gain control from the platform firmware with an unmodified MBR. This may further allow the OS to be booted up without requiring a reset of the computing system. As a result, the present systems and methods may allow PBEs to be deployed on end-points (e.g., PCs) in a secure and reliable way without losing control of the machine or any other functionality.

In one configuration, the present systems and methods may exploit at least two features available on Advanced Technology Attachment (ATA) disk drives. These features may include (1) a host protected area (HPA), and (2) address offset mode (AOM) functionality. As a result, the present systems and methods, may reliably deploy the PBE on an ATA disk drive-based PC that remains hidden and protected from the host OS, such as Windows®. This may allow the PBE to persist without losing control during a boot up sequence of the computer system. A hidden area (e.g., the HPA) on the ATA disk drive may be created to store the PBE. Further, the "start of the disk" may be dynamically switched by the AOM to boot the host OS to the system.

FIG. 1 is a block diagram illustrating one embodiment of an environment 100 in which the present systems and methods may be implemented. In one configuration, a client device 102 may include a BIOS module 104, a MBR 106, a PBE module 108, and an OS 110. The PBE module 108, and the OS 110 may be installed on a data storage device 112. The device 112 may be, but is not limited to, an ATA disk, a hard disk, a floppy disk, a boot disk, and the like. The client device 102 may be, but are not limited to, personal computers (PCs), tablets, laptops, personal digital assistants (PDAs), smartphones, or another type of computing device. The client device 102 may further include a PBE deployment module 114.

In one configuration, the BIOS module 104 may be software built into the client device 102. When the client device 102 is powered on, the BIOS module 104 may be the first code to be executed. The BIOS module 104 may initialize and identify system devices of the client device 102. These system devices may include a video display card, a keyboard and mouse, the data storage device 112, and other hardware. The BIOS module 104 may also locate boot loader software stored on the data storage device 112.

The MBR 106 may be a sector of the data storage device 112. The sector represented by the MBR 106 may include machine code to be loaded into memory (such as random-access memory (RAM)) of the client device 102. The MBR 106 may represent the actual first sector of the data storage device 112. The first sector of the data storage device 112 may include instructions for the client device 102 on the steps to take when the device 102 is powered on. The MBR 106 may further store information regarding how the data storage device 112 is partitioned.

In one embodiment, the PBE module 108 may be stored in the data storage device 112 following the MBR 106. The module 108 may be a software layer that takes over control of the client device 102 following the execution of the BIOS module 104, but before the OS 110 is booted up. The PBE module 108 may provide access to the computing platform of the device 102 very early in the boot sequence and may provide a side-channel to access the hardware, applications, and data of the client device 102, which are otherwise accessible only via the host OS 110. The PBE module 108 may provide security solutions, such as pre-boot authentication, data back-up and recovery, full disk encryption, theft deterrence, and remediation. Once the PBE module 108 has completed its tasks, the module 108 may load and execute the boot loader program. The boot loader may then boot up the OS 110 on the client device 102.

In one configuration, the PBE deployment module 114 may perform certain functions to the data storage device 112 and some of the modules stored therein. For example, the PBE deployment module 114 may create a "hidden" or protected area on the data storage device 112. A component that resides in the hidden area may operate independently from components residing in an unprotected area of the data storage device 112. Further, components in the unprotected area may not interact or access components in the protected area. In addition to creating the protected area on the data storage device 112, the deployment module 114 may further modify the coding of the PBE module 108 to enable the module 108 to implement an address offset mode (AOM). The AOM may offset the starting sector of the data storage device 112 to point to an offset MBR 106-b. The offset MBR 106-b may represent the starting sector of the data storage device 112 with an offset. The offset first sector (e.g., the offset MBR 106-b) may be loaded into memory followed. The code included in the offset MBR 106-b may execute to load the boot loader program that boots up the OS 110 and control of the client device 102 may be passed from the PBE module 108 to the OS 110. In one example, the PBE deployment module 114 may be part of the PBE module 108. In another embodiment, the PBE deployment module 114 may be separate from the PBE module 108. Details regarding the PBE deployment module 114 will be described below.

Figure 2:
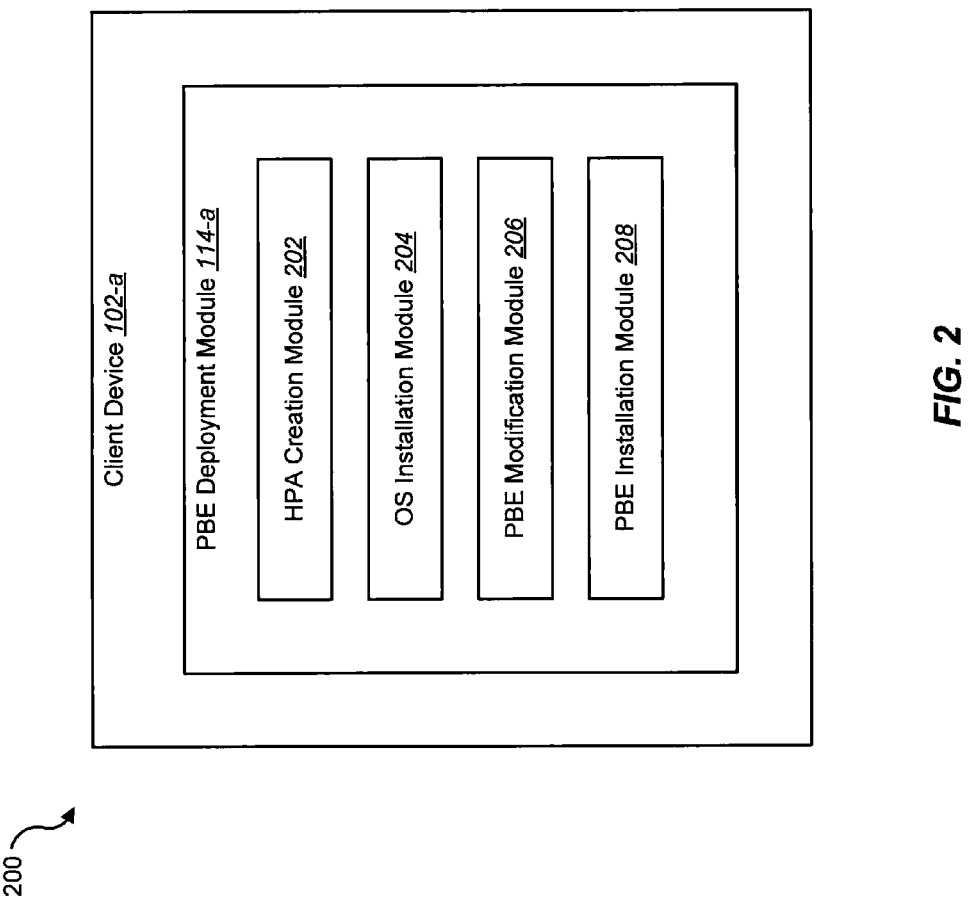
FIG. 2 is a block diagram illustrating one embodiment of a client device a in accordance with the present systems and methods.

FIG. 2 is a block diagram illustrating one embodiment of a client device 102-a in accordance with the present systems and methods. The device 102-a may be an example of the client device 102 of FIG. 1. In one example, the device 102-a may include a PBE deployment module 114-a, which may be an example of the PBE deployment module 114 of FIG. 1. In one configuration, the module 114-a may include an HPA creation module 202, an OS installation module 204, a PBE modification module 206, and a PBE installation module 208.

The modules within the deployment module 114-a may issue commands for ATA-based disk drive implementations, as per the ATA interface standards. These commands may allow driver software to perform various tasks, such as extracting drive capabilities, configuring settings, reading/writing data from/to the drive, and the like. For example, one of the values returned by the ATA command "IDENTIFY DEVICE" may be the total number of addressable sectors on the data storage device 112 (e.g., an ATA disk). This value may be used to infer available space for data storage. Additional examples of commands for data storage devices 112, such as ATA disks, may include, for example, a "READ NATIVE MAX ADDRESS" command. This command may return the real size of the entire data storage device 112. The "IDENTIFY" command may return the size of the visible (i.e., unprotected) area of the data storage device 112. Further, the command "SET MAX ADDRESS" may modify the size of the visible area of the data storage device 112. The PBE deployment module 114-a may use a combination of one or more commands to implement features exported by ATA drives.

An example ATA feature used in the present systems and methods is the host protected area (HPA). In one embodiment, the HPA creation module 202 may create the HPA on the data storage device 112. The HPA created by the creation module 202 may be a hidden contiguous area at the tail-end of the data storage device 112. The tail-end of the data storage device 112 may be shrunk to a certain size. The creation of the HPA may be achieved by invoking the ATA command "SET MAX ADDRESS". This command may be used to set the maximum addressable sector of the data storage device 112 to an address (provided as an argument) that is lower than the actual/native maximum address returned by the command "READ NATIVE MAX". The sectors that lie after the maximum address (determined by the "SET MAX ADDRESS" command) and before the native maximum address may not be included in the size reported by the "IDENTIFY DEVICE" command. As a result, the HPA may be invisible or hidden to the OS 110 and the applications associated with the OS 110.

Using the "SET MAX ADDRESS" command, the module 202 may create an HPA so that the visible area (i.e., non-HPA portion of the data storage device 112) is large enough to hold the PBE module 108. For example, the data storage device 112 may have "N" addressable sectors. If "E" (and "E" is less than "N") sectors are needed for the PBE module 108, the visible area of the data storage device 112, after HPA creation, may be from logical block address (LBA) "0" up to LBA "E-1". The disk area from LBA "E" up to LBA "N-1" may form the HPA, which may remain hidden and protected. The ATA feature also provides a way to "lock" the size/settings of the HPA until the next system reset via the command "SET MAX FREEZE LOCK". This command may restrict the "SET MAX ADDRESS" command from setting the maximum address back to the native maximum, which would otherwise make the area visible.

The OS installation module 204 may install the OS 110 to the data storage device 112. In one configuration, the module 204 may install the OS 110 to the HPA on the data storage device 112. Applications associated with the OS 110 may also be installed in the HPA. The host OS 110 and applications may be installed in the invisible area (i.e., HPA) by temporarily extending the visible region of the data storage device 112 to cover the entire disk and then shrinking the visible region back after the OS 110 and applications are installed. The extending and shrinking operations performed on the visible area of the data storage device 112 may be performed using, for example, the "SET MAX ADDRESS" command discussed above. In one configuration, installing the OS 110 to the data storage device 112 may require additional procedures, depending on the OS 110.

The PBE modification module 206 may modify portions of the coding of the PBE module 108. For example, the PBE code may be modified so that before the PBE module 108 passes control to the OS 110, the PBE module 108 enables the AOM feature. This feature may turn the visible (or unprotected) area into a hidden (or protected) area (e.g., an HPA) and the original HPA to a visible area. Moreover, the addresses for the disk sectors may now be added to an offset, which may be the size of the visible area. As a result, the sector addresses for the new visible area (i.e., the old HPA) may start from "0". Using the above example, the offset may be set to "E" (i.e., the size of the visible area of the data storage device 112). As a result, the enabled AOM may cause the original HPA on the data storage device 112 (that includes the OS 110) to become visible and the original visible area (that includes the PBE module 108) may become invisible. Further, the coding of the PBE module 108 may be modified to lock the HPA and AOM settings so that the OS 110 and/or any of the applications associated with the OS 110 are unable to view or change the sectors of the data storage device 112 that are outside of the OS area, (i.e., the original HPA).

The PBE installation module 208 may install the PBE module 108 (after being modified by the PBE modification module 206) to the data storage device 112. In one embodiment, the modified PBE module 108 may be installed in the visible area of the data storage device 112. For example, the module 108 may be installed in the area from LBA "0" up to LBA "E-1". Because the PBE module 108 is installed in the visible area, the module 108 may be loaded by the BIOS module 104 via the MBR 106-a, which is at LBA "0" and is the first sector of the PBE module 108. In one configuration, if the OS 110 has already been installed, additional procedures may be implemented to shrink the partition that includes the OS 110. Sectors of the data storage device 112 may be moved according to the size of the PBE module 108 to create space at the beginning of the data storage device 112.

Figure 3:
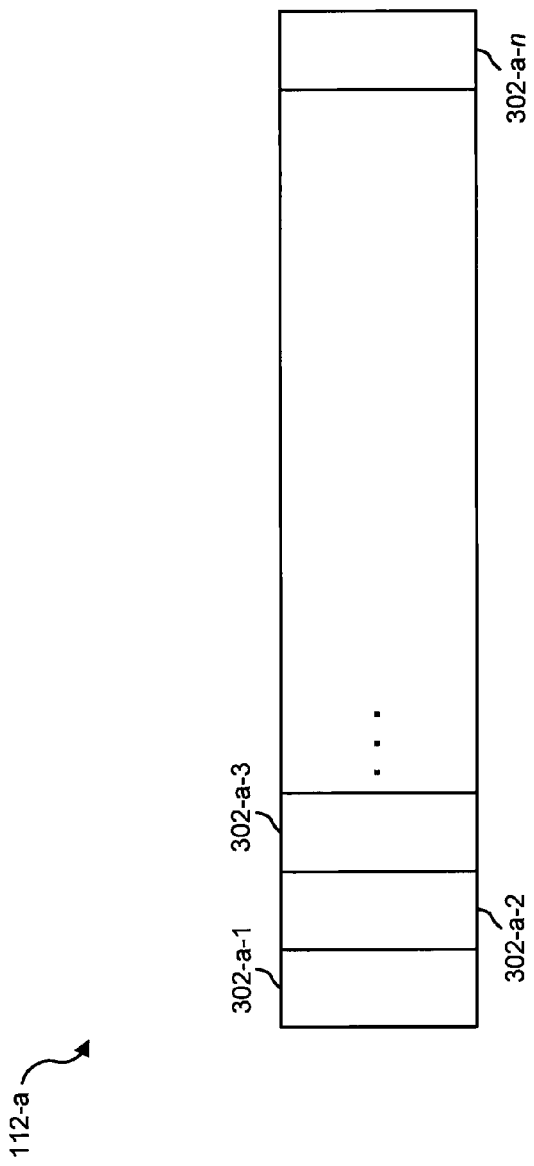
FIG. 3 is a block diagram illustrating one embodiment of a data storage device.

FIG. 3 is a block diagram illustrating one embodiment of a data storage device 112-a. The data storage device 112-a may be an example of the data storage device 112-a of FIG. 1. In one configuration, the device 112-a may be an ATA disk in accordance with the present systems and methods. The device 112-a may include a number of disk sectors 302. The total number of disk sectors 302 may represent the size of the data storage device 112-a. In one configuration, different software modules may be stored in one or more of the various disk sectors. For example, the MBR 106-a may be stored in a first disk sector 302-a-1. The PBE module 108 and the OS 110 may each be stored across a number of disk sectors. For example, the PBE module 108 and/or the OS 110 may be stored across thousands, even millions, of various disk sectors of the data storage device 112-a. When a particular software module is booted up, the corresponding disk sector(s) that store(s) the module may be loaded into the memory of the client device 102.

Figure 4:
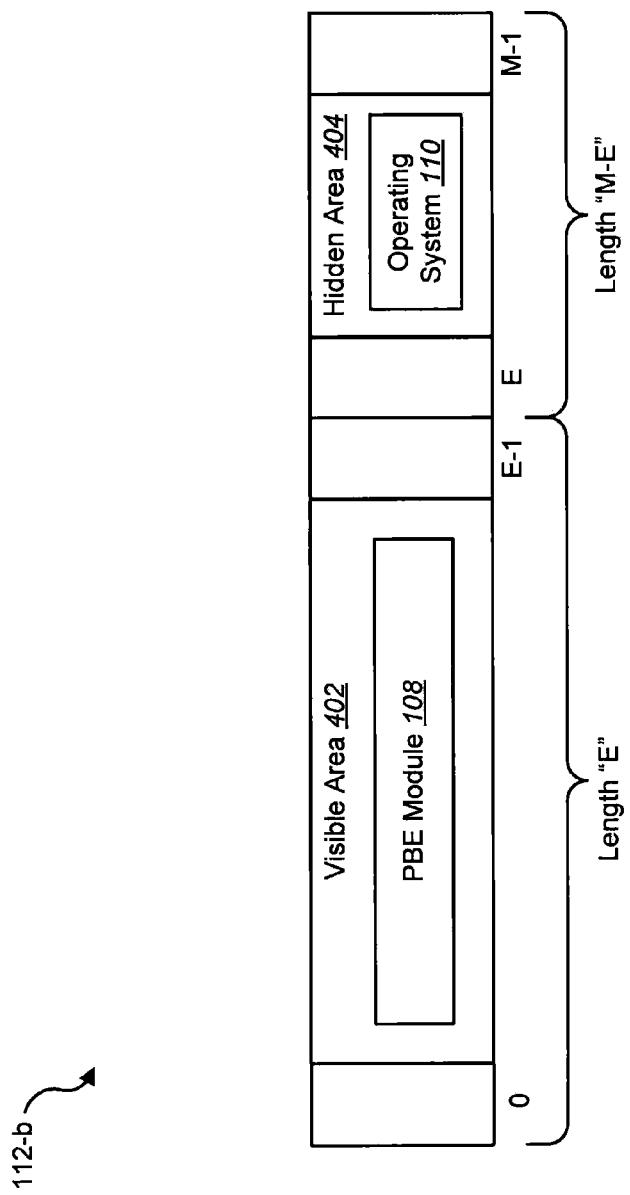
FIG. 4 is a block diagram illustrating one configuration of a data storage device that is HPA enabled.

FIG. 4 is a block diagram illustrating one configuration of a data storage device 112-b that is HPA enabled. The data storage device 112-b may be an example of the data storage device 112 of FIG. 1 or 3. In one example, the data storage device may be an ATA disk. The device 112-b may include a visible area 402 and a hidden area 404. The hidden area 404 may be an HPA. Modules within the hidden area 404 may be inaccessible by other modules that are located outside the boundaries of the hidden area 404. Further, modules within the visible area 402 and the hidden area 404 may execute independently of one another.

In one configuration, the overall length of the data storage device 112-b may be "M". The visible area 402 may include the PBE module 108. The length of the visible area 402 may be "E". As a result, the LBAs may extend from LBA "0" to LBA "E-1". The hidden area 404 may include the OS 110 and the area 404 may have a length or size of "M-E". The LBAs of the hidden area 404 may extend from LBA "E" to LBA "M-1". The hidden area 404 may be created by the HPA creation module 202 as described above. The OS 110 may be installed to the hidden area 404 by the OS installation module 204 as previously described. Similarly, the PBE module 108 may be installed by the PBE installation module 208 as described above with reference to FIG. 2.

Figure 5:
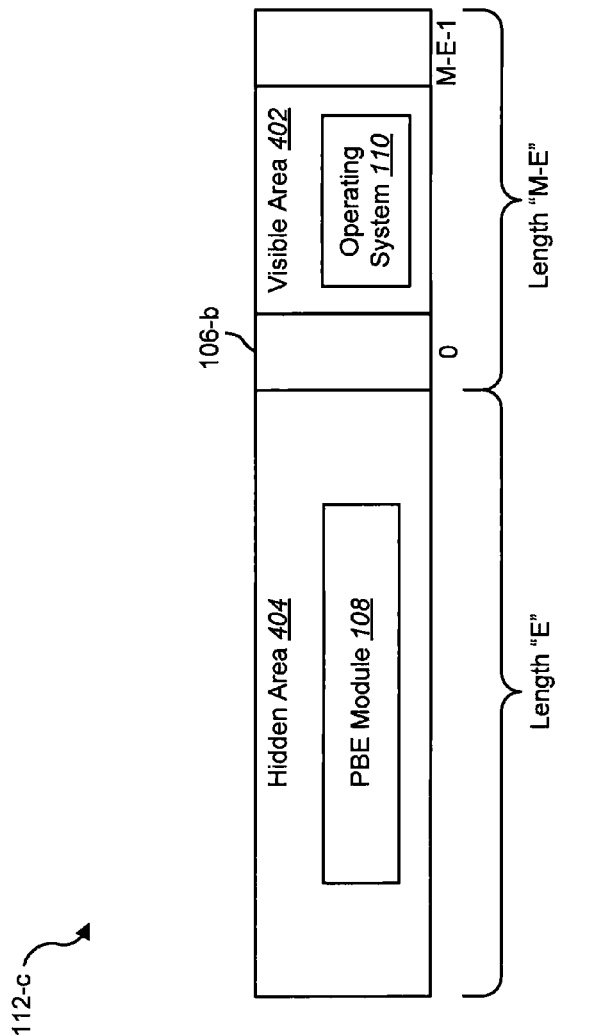
FIG. 5 is a block diagram illustrating one configuration of a data storage device that is HPA with AOM enabled.

FIG. 5 is a block diagram illustrating one configuration of a data storage device 112-c that is HPA with AOM enabled. The device 112-c may be an example of the data storage device 112 of FIG. 1, 3, or 4. In one configuration, the device 112-c may include a hidden area 404 and a visible area 402. As compared with the device 112-b of FIG. 4, the hidden area 404 includes the PBE module 108 and the visible area 402 includes the OS 110. In one configuration, the PBE module 108 may be modified to enable AOM. In this example, the AOM may offset the starting disk sector by the length "E". As a result, when the PBE module 108 terminates execution, the offset MBR 106-a, which represents the disk sector at the offset "E" may be loaded into memory, followed by the booting up of the OS 110. Because the starting disk sector has been offset by the length "E", the PBE module 108 (located in disk sectors "0" (with no offset) to "E-1") will remain invisible to and inaccessible by the OS 110. As a result, the security solutions implemented by the PBE module 108 may not be bypassed or disabled by malware upon booting up the OS 110.

Figure 6:
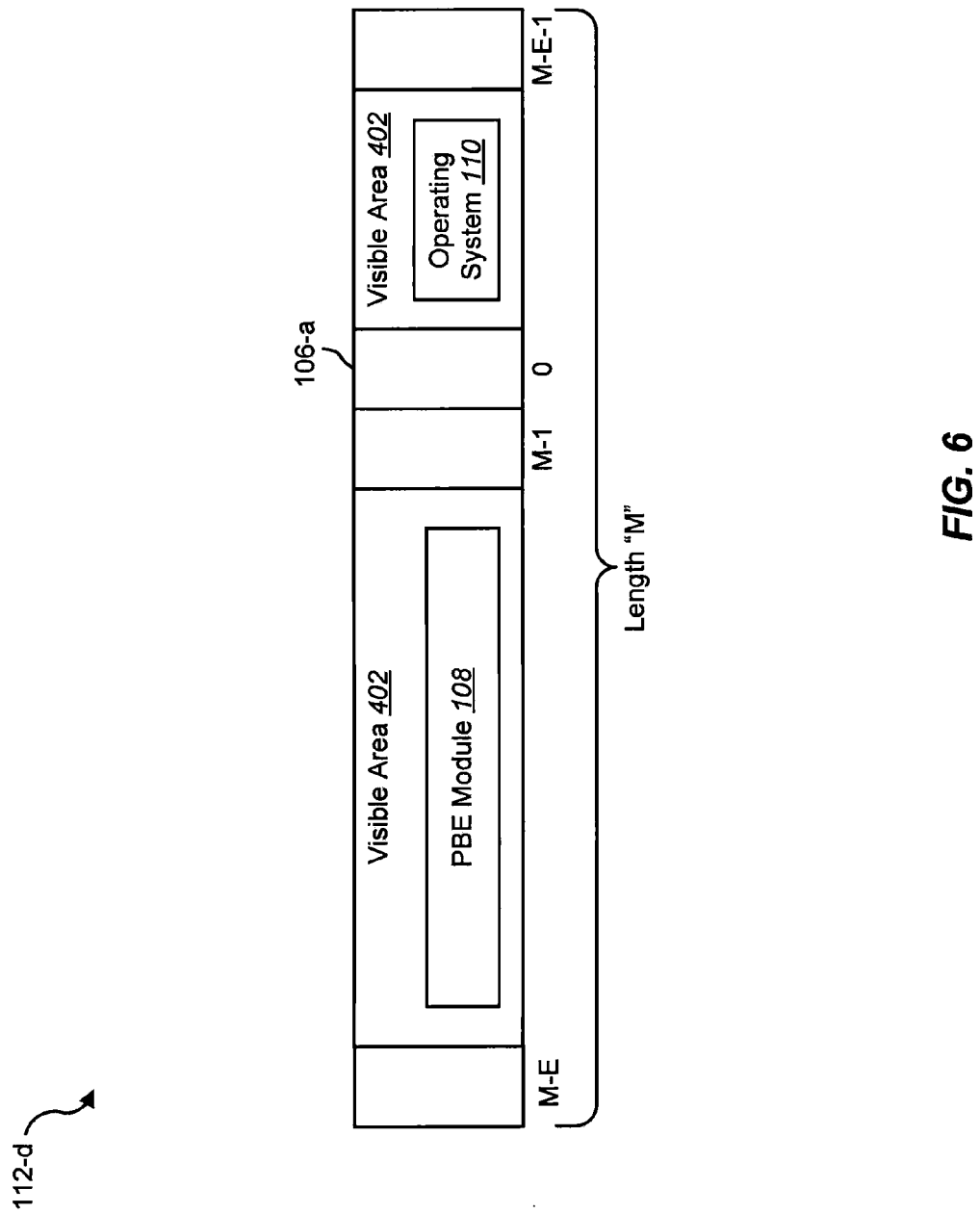
FIG. 6 is a block diagram illustrating one example of a data storage device with the max address set to the actual length of the device after HPA and AOM are enabled.

FIG. 6 is a block diagram illustrating one example of a data storage device 112-d with the max address set to the actual length of the device 112-d. The data storage device 112-d may be an example of the device 112 of FIG. 1, 3, 4, or 5. In one embodiment, the length or size of the data storage device 112-d may be "M". In one example, the PBE module 108 may temporarily disable the HPA. As a result, each region of the data storage device 112-d may be visible. For example, the visible areas 402 may include the PBE module 108 and the OS 110. The HPA may be disabled by the PBE module 108 issuing the command "SET MAX ADDRESS" to the address "M". As a result, the visible portions of the data storage device 112-d are equal to "M", which is the total size of the device 112-d. With the entire device 112-d visible, the MBR 106-a (without the offset) representing the first sector of the data storage device 112-d may be located just before the OS 110 and the disk sectors may wraparound from the sector M-E-1 to M-E, as illustrated in FIG. 6. The PBE module 108 may disable the HPA if the module 108 desires to access and modify sectors of the data storage device 112-d in which the OS 110 is located. When the PBE module 108 does not need to access these sectors anymore, the PBE module 108 may issue the "SET MAX ADDRESS" command to re-enable the HPA on the data storage device 112-d.

Figure 7:
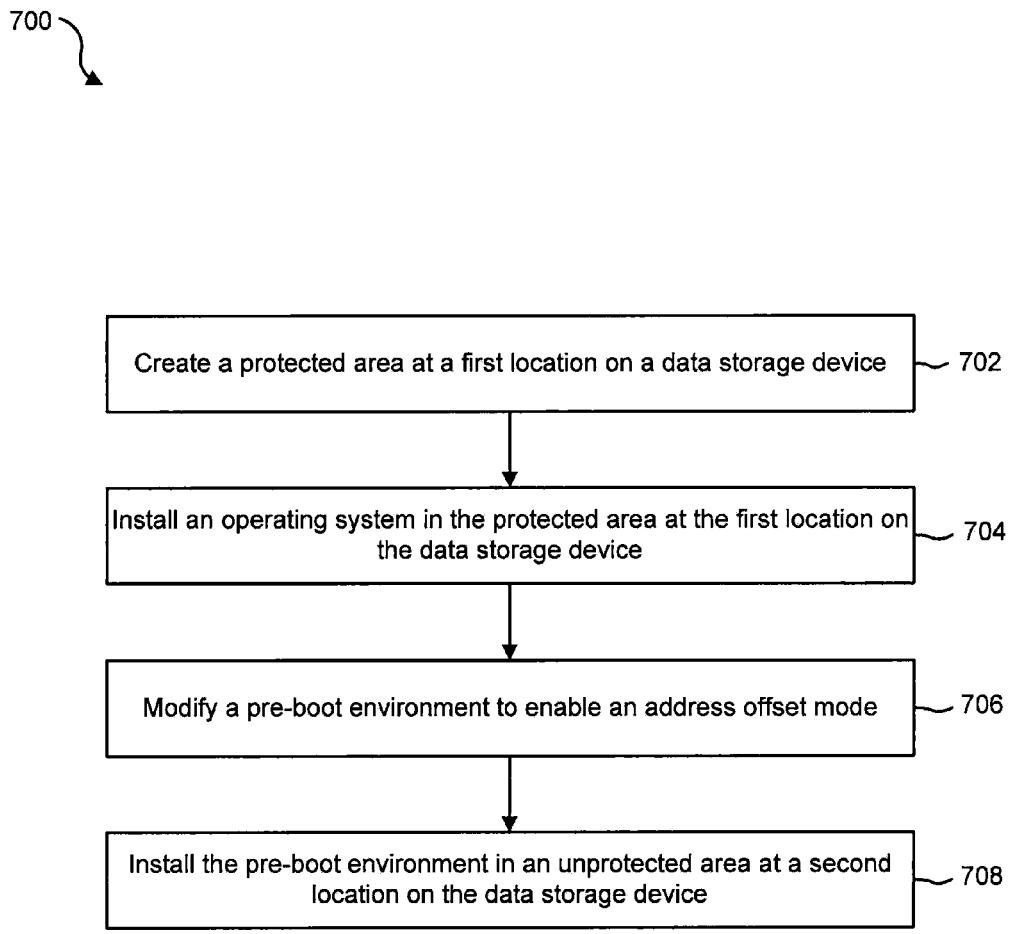
FIG. 7 is a flow diagram illustrating one embodiment of a method to deploy a pre-boot operating environment (i.e., the PBE module) on a data storage device for a PC.

FIG. 7 is a flow diagram illustrating one embodiment of a method 700 to deploy a pre-boot operating environment (i.e., the PBE module 108) on a data storage device 112 for a PC. In one example, the method 700 maybe implemented by the PBE deployment module 114 of FIG. 1 or 2.

At block 702, a protected area may be created at a first location on the data storage device 112. The device 112 may be an ATA hard drive. For example, an HPA may be created at the tail end of the ATA disk. At block 704, an OS 110 may be installed in the protected area at the first location on the data storage device 112. The OS 110 may be installed by causing substantially the entire ATA disk to become unprotected, install the OS 110, and then decrease the unprotected area so that the OS 110 is stored within the protected area at the first location on the ATA disk. At block 706, a pre-boot environment (PBE) may be modified to enable an address offset mode (AOM). The AOM may cause the beginning sector of the protected area to be loaded to memory after the PBE has completed its tasks. At block 708, the PBE may be installed in an unprotected area at a second location on the data storage device 112. In one configuration, the second location representing the unprotected area may be different than the first location representing the protected area on the data storage device 112

Thus, the method 700 allows a pre-boot environment to deploy on a data storage device 112 of a PC. It is to be understood that the method 700 is just one implementation and that the operations of the method 700 may be rearranged or otherwise modified such that other implementations are possible.

Figure 8:
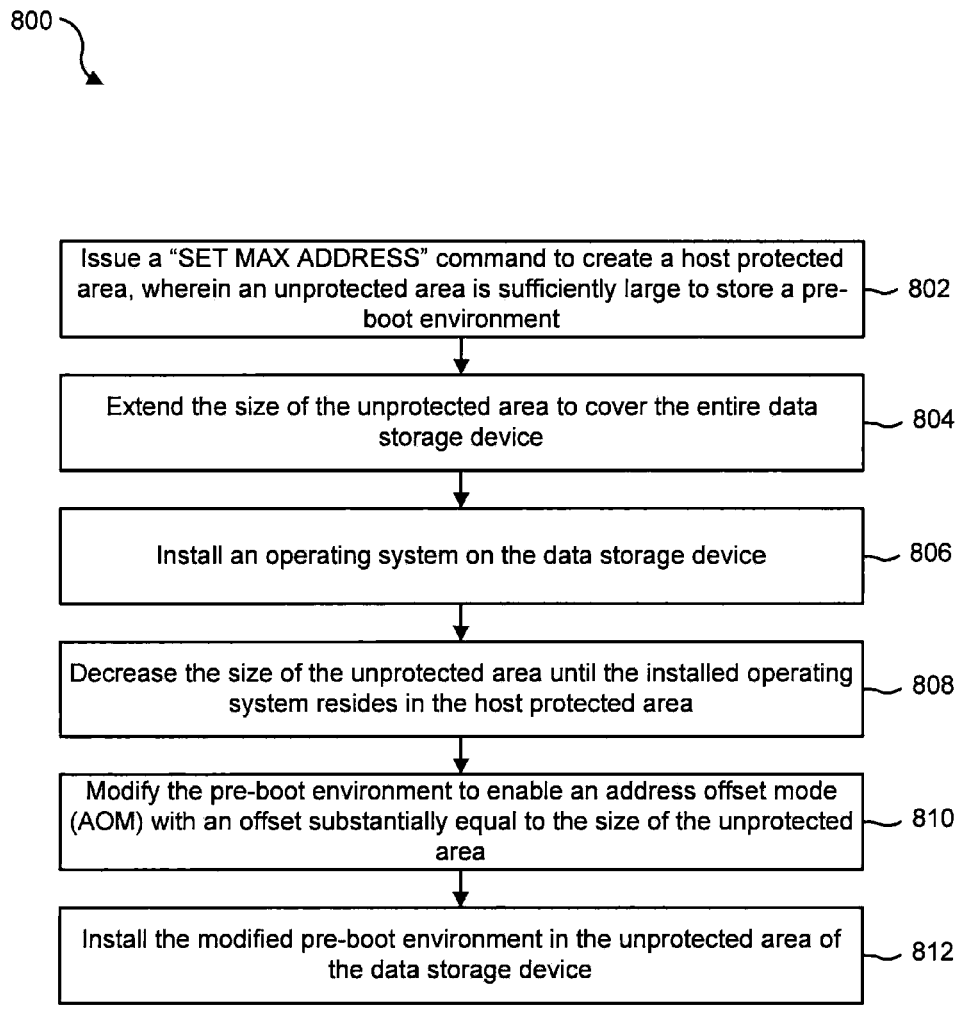
FIG. 8 is a flow diagram illustrating one embodiment of a method to deploy a pre-boot environment on an ATA disk for a PC.

FIG. 8 is a flow diagram illustrating one embodiment of a method 800 to deploy a pre-boot environment on an ATA disk for a PC. In one example, the method 800 may be implemented by the PBE deployment module 114 of FIG. 1 or 2.

At block 802, a "SET MAX ADDRESS" command may be issued to create an HPA. The created HPA may not include the entire ATA disk. As a result, part of the ATA disk includes the HPA and another part of the ATA disk includes an unprotected area. In one configuration, the unprotected area resulting from the creation of the HPA may be sufficiently large to store a pre-boot environment, such as the PBE module 108.

At block 804, the size of the unprotected area may be extended to cover the entire data storage device. As a result, the HPA is temporarily disabled and the entire ATA disk becomes accessible, unprotected, visible, etc. At block 806, an OS 110 may be installed on the ATA disk. The OS 110 may be installed at the location of the ATA disk that previously included the HPA (which has been temporarily disabled). At block 808, the size of the unprotected area may be decreased until the HPA again becomes active and the installed OS 110 resides in the HPA. As a result, part of the ATA disk includes the HPA (where the OS 110 is installed) and the remaining part of the ATA disk includes an unprotected area.

At block 810, the PBE (e.g., the coding of the PBE module 108) may be modified to enable an AOM with an offset substantially equal to the size of the unprotected area. At block 812, the modified PBE may be installed in the unprotected area of the data storage device. Once the PBE completes its functions, it may turn control over to the OS 110. This may be accomplished by loading the first sector of the HPA. The first sector may be identified by the AOM that points to the end of the unprotected area, which is the beginning of the HPA. By pointing to the first sector of the HPA, the HPA may now become visible (i.e., unprotected). Similarly, the unprotected area that includes the PBE may now become an HPA. As a result, the OS 110 and the PBE may operate independently from each other. In addition, the OS 110 (and its applications) may not be able to gain access to the PBE because while the OS 110 is booted up, the location on the ATA disk that stores the PBE has become invisible and inaccessible.

As a result, after substantially every system reboot, the BIOS module 104 may load and pass control to the PBE module 108 while the OS 110 remains invisible. After the PBE module 108 has performed its tasks, it may enable AOM, which results in turning the HPA visible, and loads the first sector of the previous HPA into memory and control is passed to the OS 110. While the OS 110 is in control of the PC, the area including the PBE module 108 may remain hidden and inaccessible to the OS 110 and its applications. The handoff of control from the PBE module 108 to the OS 110 may be performed without a reboot and without compromising the reliability, portability, and deployment of the PBE module 108.

In one embodiment, if the PBE module 108 needs to be able to access and modify sectors of the area on the ATA disk that includes the OS 110, the HPA may be temporarily disabled. When the PBE module 108 does not need to access the area including the OS 110, the HPA may be re-enabled. Before the OS 110 gains control of the PC, the size of the HPA may be locked by in-memory PBE code, and may not be unlocked until a reset of the PC, when the PBE module 108 may again take over control of the PC.

Figure 9:
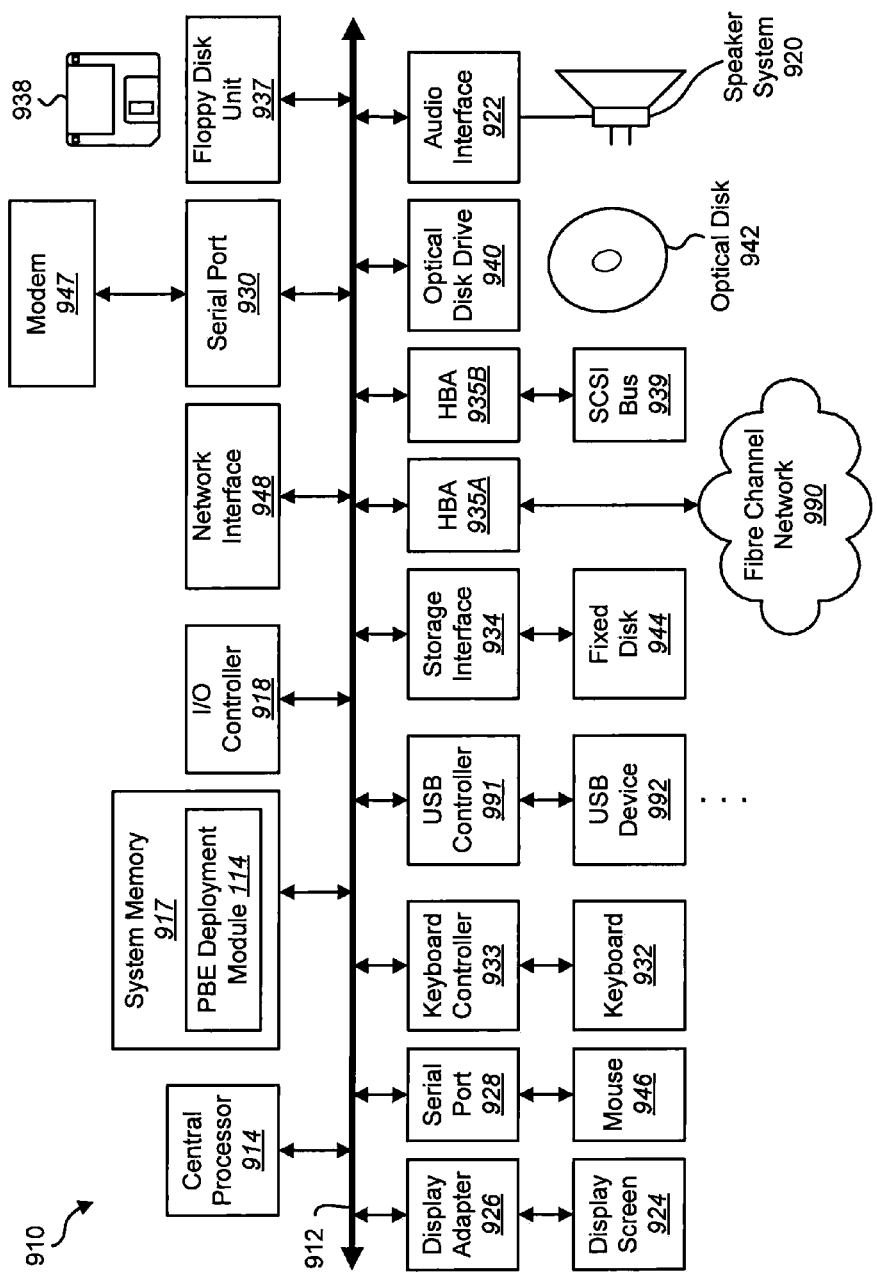
FIG. 9 depicts a block diagram of a computer system suitable for implementing the present systems and methods.

FIG. 9 depicts a block diagram of a computer system 910 suitable for implementing the present systems and methods. The computer system 910 may be an example of the client device 102 of FIG. 1. Computer system 910 includes a bus 912 which interconnects major subsystems of computer system 910, such as a central processor 914, a system memory 917 (typically RAM, but which may also include ROM, flash RAM, or the like), an input/output controller 918, an external audio device, such as a speaker system 920 via an audio output interface 922, an external device, such as a display screen 924 via display adapter 926, serial ports 928 and 930, a keyboard 932 (interfaced with a keyboard controller 933), multiple USB devices 992 (interfaced with a USB controller 991), a storage interface 934, a floppy disk unit 937 operative to receive a floppy disk 938, a host bus adapter (HBA) interface card 935A operative to connect with a Fibre Channel network 990, a host bus adapter (HBA) interface card 935B operative to connect to a SCSI bus 939, and an optical disk drive 940 operative to receive an optical disk 942. Also included are a mouse 946 (or other point-and-click device, coupled to bus 912 via serial port 928), a modem 947 (coupled to bus 912 via serial port 930), and a network interface 948 (coupled directly to bus 912).

Bus 912 allows data communication between central processor 914 and system memory 917, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components or devices. For example, PBE deployment module 114 to implement the present systems and methods may be stored within the system memory 917. Applications resident with computer system 910 are generally stored on and accessed via a non-transitory computer readable medium, such as a hard disk drive (e.g., fixed disk 944), an optical drive (e.g., optical drive 940), a floppy disk unit 937, or other storage medium. Additionally, applications can be in the form of electronic signals modulated in accordance with the application and data communication technology when accessed via network modem 947 or interface 948.

Storage interface 934, as with the other storage interfaces of computer system 910, can connect to a standard computer readable medium for storage and/or retrieval of information, such as a fixed disk drive 944. Fixed disk drive 944 may be a part of computer system 910 or may be separate and accessed through other interface systems. Modem 947 may provide a direct connection to a remote server via a telephone link or to the Internet via an internet service provider (ISP). Network interface 948 may provide a direct connection to a remote server via a direct network link to the Internet via a POP (point of presence). Network interface 948 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 9 need not be present to practice the present systems and methods. The devices and subsystems can be interconnected in different ways from that shown in FIG. 9. The operation of a computer system such as that shown in FIG. 9 is readily known in the art and is not discussed in detail in this application. Code to implement the present disclosure can be stored in a non-transitory computer-readable medium such as one or more of system memory 917, fixed disk 944, optical disk 942, or floppy disk 938. The operating system provided on computer system 910 may be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present systems and methods may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 10:
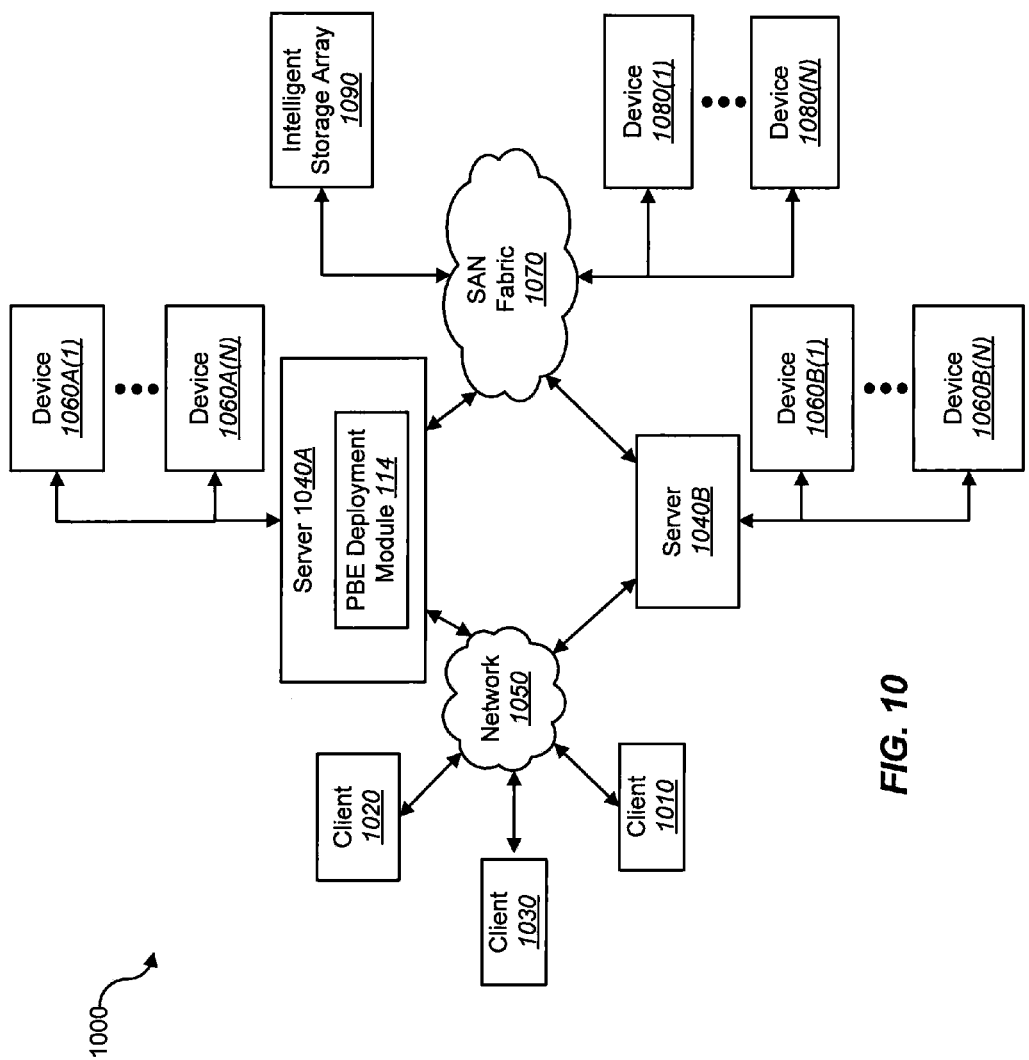
FIG. 10 is a block diagram depicting a network architecture in which client systems, as well as storage servers (any of which can be implemented using computer system), are coupled to a network.

FIG. 10 is a block diagram depicting a network architecture 1000 in which client systems 1010, 1020 and 1030, as well as storage servers 1040A, 1040B (any of which can be implemented using computer system 1010), are coupled to a network 1050. In one embodiment, the PBE deployment module 114 may be located within the storage servers 1040A, 1040B to implement the present systems and methods. The storage server 1040A is further depicted as having storage devices 1060A(1)-(N) directly attached, and storage server 1040B is depicted with storage devices 1060B(1)-(N) directly attached. SAN fabric 1070 supports access to storage devices 1080(1)-(N) by storage servers 1040A, 1040B, and so by client systems 1010, 1020 and 1030 via network 1050. Intelligent storage array 1090 is also shown as an example of a specific storage device accessible via SAN fabric 1070.

With reference to computer system 910, modem 947, network interface 948 or some other method can be used to provide connectivity from each of client computer systems 1010, 1020, and 1030 to network 1050. Client systems 1010, 1020, and 1030 are able to access information on storage server 1040A or 1040B using, for example, a web browser or other client software (not shown). Such a client allows client systems 1010, 1020, and 1030 to access data hosted by storage server 1040A or 1040B or one of storage devices 1060A(1)-(N), 1060B(1)-(N), 1080(1)-(N) or intelligent storage array 1090. FIG. 10 depicts the use of a network such as the Internet for exchanging data, but the present systems and methods are not limited to the Internet or any particular network-based environment.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present systems and methods and their practical applications, to thereby enable others skilled in the art to best utilize the present systems and methods and various embodiments with various modifications as may be suited to the particular use contemplated.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method to deploy a pre-boot environment in a computing system, comprising:
   creating a protected area at a first location on a data storage device of the computing system;
   installing an operating system in the protected area at the first location on the data storage device;
   installing the pre-boot environment in an unprotected area at a second location on the data storage device, the pre-boot environment comprising software configured to enable an address offset mode; and
   initiating the pre-boot environment after executing the computing system's firmware and before booting the operating system.

2. The method of claim 1, wherein creating the protected area further comprises:
determining the size of the pre-boot environment, wherein the size of the pre-boot environment is less than the size of the data storage device; and
setting the size of the unprotected area of the data storage device substantially equal to the size of the pre-boot environment.

3. The method of claim 1, wherein installing the operating system in the protected area further comprises:
disabling the protected area by increasing the size of the unprotected area to cover substantially the data storage device; and
re-enabling the protected area by decreasing the size of the unprotected area to substantially cover the size of the pre-boot environment.

4. The method of claim 1, wherein the address offset mode comprises an offset substantially equal to the size of the unprotected area.

5. The method of claim 1, further comprising:
locking settings associated with the protected area and the address offset mode, wherein locked settings prevents modifications to the settings of the protected area and the address offset mode.

6. The method of claim 1, wherein the data storage device comprises an advanced technology attachment (ATA) interface.

7. The method of claim 1, further comprising:
issuing a command to create the protected area on the data storage device.

8. The method of claim 1, further comprising:
issuing a command to increase and decrease the size of the unprotected area on the data storage device.

9. The method of claim 1, further comprising:
disabling the protected area;
modifying one or more sectors within the disabled protected area; and
re-enabling the protected area.

10. A computing device configured to deploy a pre-boot environment, comprising:
a processor;
memory in electronic communication with the processor;
instructions stored in the memory, the instructions being executable by the processor to:
create a protected area at a first location on a data storage device of the computing system;
install an operating system in the protected area at the first location on the data storage device;
install the pre-boot environment in an unprotected area at a second location on the data storage device, the pre-boot environment comprising software configured to enable an address offset mode;
initiate the pre-boot environment after executing the computing system's firmware and before booting the operating system.

11. The computing device of claim 10, wherein the pre-boot environment deployment module is further configured to:
determine the size of the pre-boot environment, wherein the size of the pre-boot environment is less than the size of the data storage device; and
set the size of the unprotected area of the data storage device substantially equal to the size of the pre-boot environment.

12. The computing device of claim 10, wherein the pre-boot environment deployment module is further configured to:
disable the protected area by increasing the size of the unprotected area to cover substantially the data storage device; and
re-enable the protected area by decreasing the size of the unprotected area to substantially cover the size of the pre-boot environment.

13. The computing device of claim 10, wherein the pre-boot environment deployment module is further configured to:
lock settings associated with the protected area and the address offset mode, wherein locked settings prevents modifications to the settings of the protected area and the address offset mode.

14. The computing device of claim 10, wherein the data storage device comprises an advanced technology attachment (ATA) interface.

15. The computing device of claim 10, wherein the pre-boot environment deployment module is further configured to:
issue a command to create the protected area on the data storage device.

16. The computing device of claim 10, wherein the pre-boot environment deployment module is further configured to:
issue a command to increase and decrease the size of the unprotected area on the data storage device.

17. The computing device of claim 10, wherein the pre-boot environment deployment module is further configured to:
disable the protected area;
modify one or more sectors within the disabled protected area; and
re-enable the protected area.

18. A computer-program product for deploying a pre-boot environment, the computer-program product comprising a non-transitory computer-readable medium having instructions thereon, the instructions comprising:
code programmed to create a protected area at a first location on a data storage device of the computing system;
code programmed to install an operating system in the protected area at the first location on the data storage device;
code programmed to install the pre-boot environment in an unprotected area at a second location on the data storage device, the pre-boot environment comprising software configured to enable an address offset mode; and
code programmed to initiate the pre-boot environment after executing the computing system's firmware and before booting the operating system.

19. The computer-program product of claim 18, wherein instructions further comprise code programmed to:
code programmed to determine the size of the pre-boot environment, wherein the size of the pre-boot environment is less than the size of the data storage device; and
code programmed to set the size of the unprotected area of the data storage device substantially equal to the size of the pre-boot environment.

20. The computing device of claim 10, wherein the address offset mode comprises an offset substantially equal to the size of the unprotected area.

* * * * *